(12) United States Patent
Abo et al.

(10) Patent No.: US 6,400,589 B2
(45) Date of Patent: Jun. 4, 2002

(54) CONTROL APPARATUS FOR A POWER SUPPLY CIRCUIT INCLUDING PLURAL CONVERTER

(75) Inventors: Shoji Abo; Hidenori Yokoyama; Nobuyuki Okabe, all of Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 09/758,240

(22) Filed: Jan. 12, 2001

(30) Foreign Application Priority Data

Jan. 13, 2000 (JP) ......................... 2000-004944
May 26, 2000 (JP) ......................... 2000-156547

(51) Int. Cl.$^7$ ........................... H02M 7/00; G05F 1/577
(52) U.S. Cl. ........................... 363/65; 323/267
(58) Field of Search .................. 363/65; 323/267, 323/268, 271

(56) References Cited

U.S. PATENT DOCUMENTS 4,816,739 A * 3/1989 Sakurai et al. ............... 323/272
5,404,092 A * 4/1995 Gegner ........................ 323/207
5,894,415 A * 4/1999 Habegger ..................... 363/65
6,058,030 A * 5/2000 Hawkes et al. ............... 363/65

FOREIGN PATENT DOCUMENTS

JP (P) Hei 09-289707    11/1997

* cited by examiner

Primary Examiner—Adolf Deneke Berhane
(74) Attorney, Agent, or Firm—Kenyon & Kenyon (57) ABSTRACT

The invention provides a circuit for supplying electric power to a load using a high voltage battery, the circuit supplying a dark current when the load is not being operated. A high voltage load and a low voltage load are attached to a battery and electric power is supplied to the low voltage load through a main DC-DC converter and a sub DC-DC converter. When an ignition switch is OFF, only the sub converter supplies the dark current to the low voltage load and the main DC-DC converter is turned OFF. When the ignition switch is ON, the main DC-DC converter supplies required electric power. Since a low-capacity sub DC-DC converter supplies the dark current, the battery discharge can be prevented.

28 Claims, 8 Drawing Sheets

CONTROL APPARATUS FOR A POWER SUPPLY CIRCUIT INCLUDING PLURAL CONVERTER

INCORPORATION BY REFERENCE

The disclosures of Japanese Patent Application No. 2000-004944 filed on Jan. 13, 2000, and No. 2000-156547 filed on May 26, 2000, including the specifications, drawings and abstracts are incorporated herein by reference in their entirety.

BACKGROUND OF THE INVENTION

1. Field of the Invention

The invention relates generally to a power supply circuit, and more specifically to a power supply circuit for supplying predetermined electric power during of a load.

2. Description of Related Art

In general, vehicles and so forth are known to have a circuit that supplies electric power from a battery in order to operate a load such as bulbs and motors.

For example, Japanese Patent Application Laid-open Publication No. HEI 09-289707 describes a power supply system for an electric vehicle, disclosing a technology where a high voltage battery is used as a common power supply and its voltage is distributed to a plurality of power supply groups, each of which is provided with a DC-DC converter that is in accordance with the type and magnitude of a load belonging thereto. According to this technology, when the driver turns ON an ignition switch of a vehicle to operate each of the loads, the DC-DC converter that is in accordance with the type and magnitude of the load belonging to a power supply pertaining to the load is activated and electric power that meets the load is supplied.

In recent years, computerization has also progressed in vehicles, which now have many loads installed that have memory functions. In this case, it is necessary to supply constant electric power (a dark current) thereto when the load is not being operated to maintain the content of the memory. Moreover, there may be loads which are on standby that require a constant dark current even when the load is not being operated to ensure quick operation thereof. When a power supply system is used that does not consider electric power supply when the load is being operated, when the user wishes to supply a specified amount of electric power (the dark current) to a certain load when the load is not being operated, the user has no other choice but to activate the DC-DC converter of a power supply group to which the load belongs. Therefore, because of power consumption of the DC-DC converter having a large capacity (i.e. service capacity) exceeding a capacity necessary for supplying the dark current, there is a fear that the capacity (i.e. remaining capacity) of the battery might drop.

Moreover, in the above-mentioned related technology, since the DC-DC converter having a capacity required to operate the load is used, once an abnormality occurs and the DC-DC converter is activated erroneously, the load which is not being operated is supplied with an amount of electric power corresponding to the capacity of the DC-DC converter; therefore there is also a fear that the capacity of the battery might drastically drop.

SUMMARY OF THE INVENTION

In light of the above-mentioned problems, it is the object of the invention to provide a circuit that can supply a specified amount of electric power when the load is not being operated or when the load is being operated but requires a smaller amount of electric power than for normal operation while suppressing capacity reduction of the battery, as well as suppress the capacity reduction of the battery even when supplying the load with electric power due to erroneous activation.

In order to achieve the above-mentioned object, an embodiment according to the invention is a power supply for a vehicle for supplying electric power to a load, comprising a battery, a first converter, and a second converter.

The first converter changes a voltage of the battery and supplies main electric power to the load. The second converter changes the voltage of the battery and supplies auxiliary electric power to the load.

By providing the second converter in addition to the first converter, required electric power can be supplied to the load even when the load is not being operated without greatly reducing the capacity of the battery.

DETAILED DESCRIPTION OF THE PREFERRED EMBODIMENTS

Figure 1:
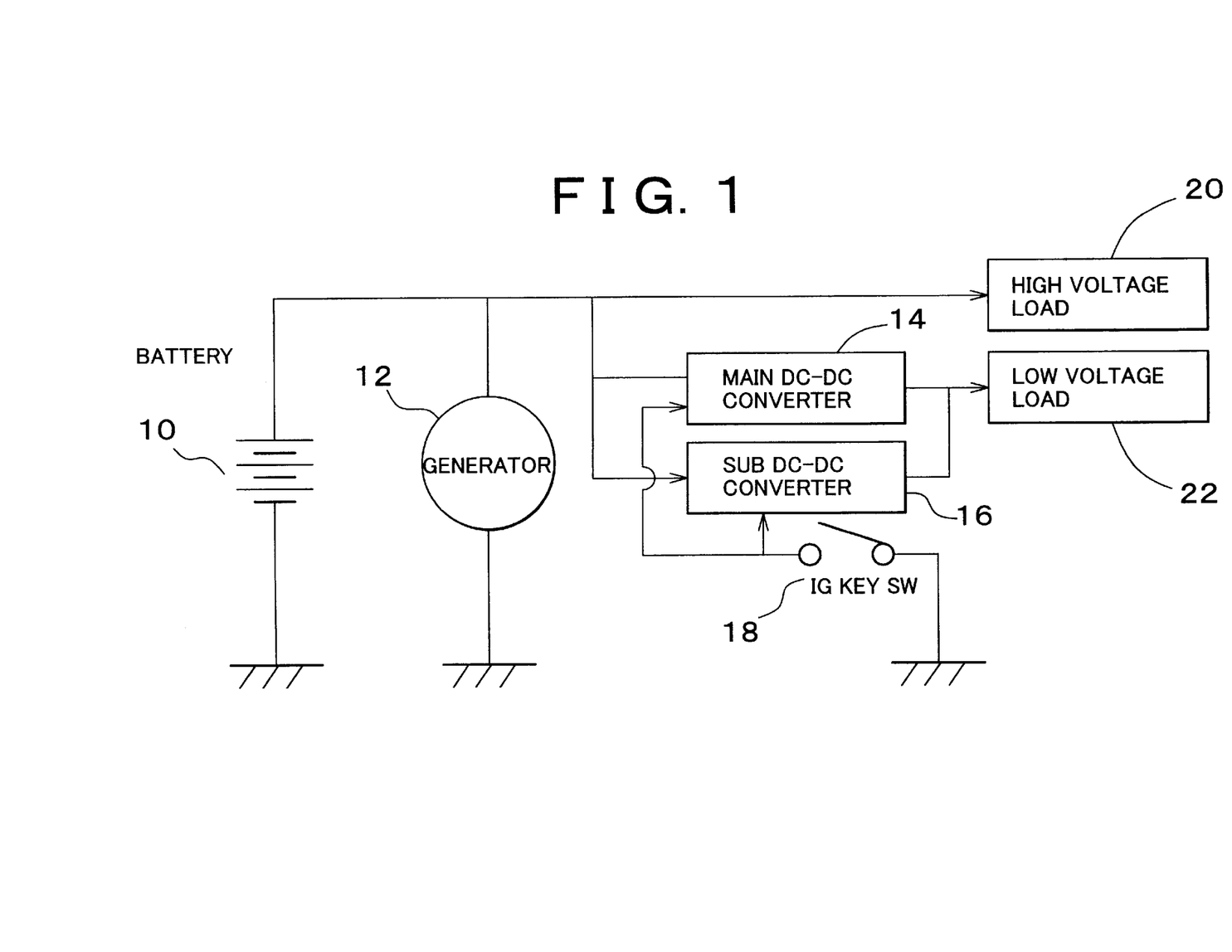
FIG. 1 is a view showing a circuit configuration of a first embodiment according to the invention.

FIG. 1 shows the circuit configuration of this embodiment according to the invention. In the circuit of FIG. 1, a specified amount of electric power is supplied to a high voltage load 20 and a low voltage load 22 of a vehicle from a battery 10. The battery 10 may be, for example, a high voltage battery (36 V), and the high voltage load 20 may be a starter circuit and the low voltage load 22 may be a power window circuit or a door lock circuit. A generator 12 is connected to the battery 10 which can be charged by operating the generator 12 as necessary. Further, the generator 12 can be made to function as a motor by supplying electric power thereto from the battery 10.

The high voltage load 20 is connected directly to the battery 10 and operates with a high voltage (36 V) therefrom. On the other hand, the low voltage load 22 is connected to the battery 10 through a DC-DC converter and is supplied with a voltage that is reduced by the DC-DC converter. In this embodiment, the DC-DC converter provided between the battery 10 and the low voltage load 22 is composed of a plurality of DC-DC converters, namely a main converter 14 (first converting means) and a sub converter 16 (second converting means). The main converter 14 has a large capacity compared to the sub converter 16. For example, the main converter 14 may have a capacity of 1 kW or so and the sub converter 16 a capacity of 1 W or so. In the configuration of FIG. 1, the main converter 14 and the sub converter 16 are connected in parallel to each other and then connected to the low voltage load 22 to supply electric power to memory devices of a low voltage load and power system loads.

An ignition (IG) switch 18 is connected to the main converter 14 and the sub converter 16, and activation and deactivation of both converters are linked with ON and OFF of the ignition switch 18 of the vehicle. The main converter 14 supplies power-system electric power (main electric power) required at the time of operation of the low voltage load 22. The sub converter 16 supplies memory-system electric power (sub electric power), more specifically the dark current, which is required when the low voltage load 22 is not being operated. Therefore, in terms of basic operation, when the ignition switch 18 is turned ON and it becomes necessary for the low voltage load 22 to be operated, the main converter 14 is activated. When the ignition switch 18 is turned OFF and the low voltage load 22 is not being operated and thus it becomes necessary for the dark current to be supplied in order to maintain a memory state, the sub converter 16 is activated.

Figure 2:
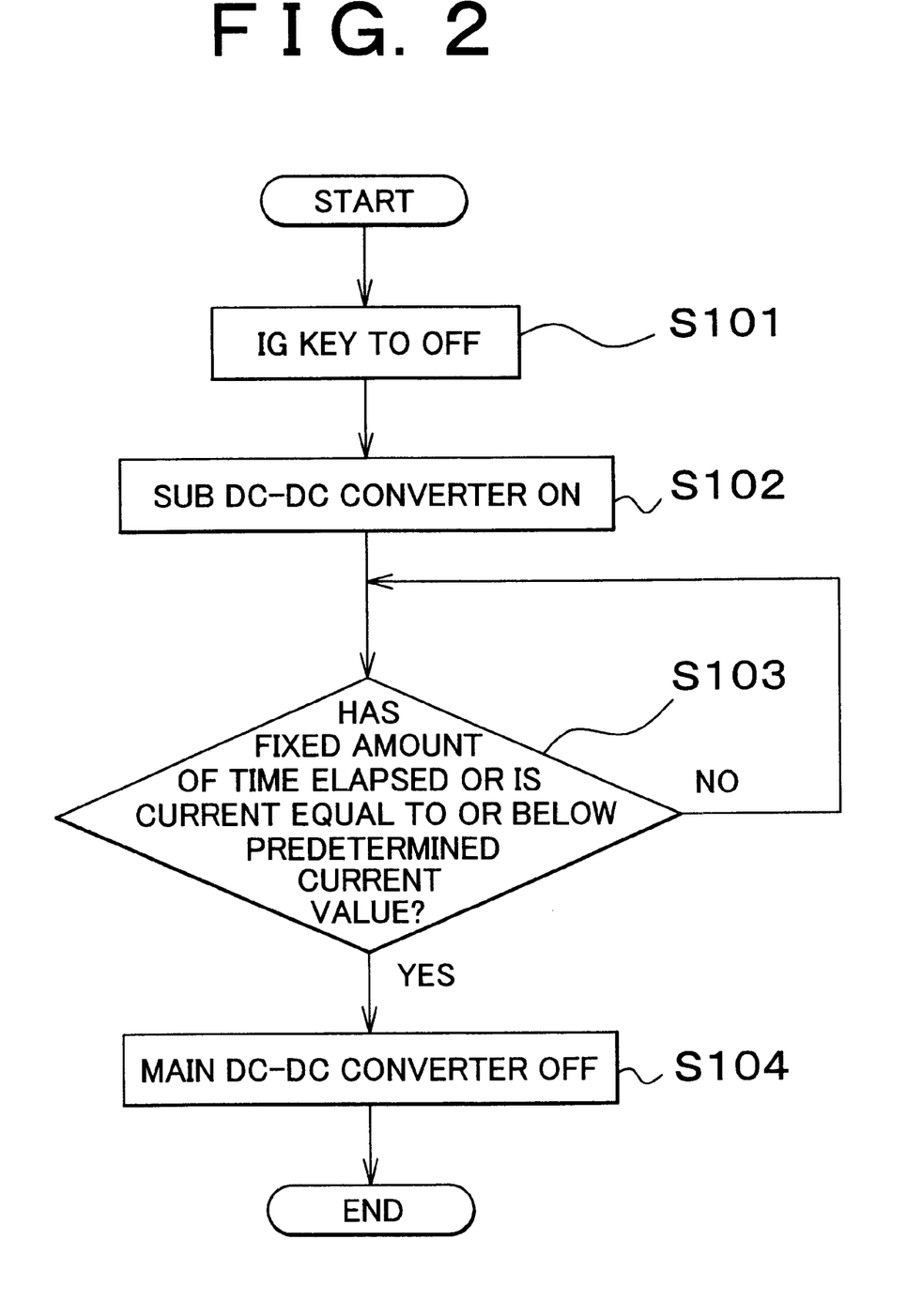
FIG. 2 is a process flowchart of the first embodiment according to the invention.

FIG. 2 shows a process flowchart of an embodiment according to the invention. First, when the operator (normally, the driver of the vehicle) turns OFF the ignition switch 18 (S101), the sub converter 16 is activated (S102). The sub converter 16 changes a high voltage (36 V) of the battery 10 into a low voltage for the supply of the dark current and supplies it to the low voltage load 22. When the ignition is ON, the main converter 14 is being activated (ON), and when the ignition switch 18 is turned from ON to OFF, the main converter is not deactivated immediately but is maintain in the ON state. Then, whether a fixed amount of time has elapsed while the main converter 14 is maintained in the ON state is judged or whether the current value of the main converter 14 becomes equal to or less than a predetermined value while the main converter 14 is maintained in the ON state is judged (S103). If the fixed amount of time has elapsed or the current becomes equal to or less than the predetermined value, the main converter 14 is turned OFF (Step S104) and electric power is supplied to the low voltage load 22 by the sub converter 16 only.

Note that the reason for the main converter 14 not being deactivated immediately but being deactivated with a predetermined delay after the ignition switch 18 was turned OFF is because of consideration for cases such as when the operator operates a power window motor to raise or lower windows even after the ignition switch 18 has been turned OFF. In such a case, the power window motors and the like cannot be driven by the sub converter 16 only because of its small capacity so the large amount of electric power of the main converter becomes necessary.

Incidentally, when the ignition switch 18 is ON, the main converter 14 is being activated (ON) and the sub converter 14 is deactivated (OFF). Needless to say, when the ignition switch 18 is ON, both the main converter 14 and the sub converter 16 may be activated. However in the standpoint of suppressing power consumption, it is preferable that only the main converter 14 is being activated in that case.

Thus, in this embodiment, when the ignition switch 18 is turned OFF, the dark current is supplied to the low voltage load 22 not by the main converter 14 but by the sub converter 16. Therefore, it is not necessary for the large-capacity main converter 14 to be activated to supply the dark current, so the capacity reduction of the battery 10 is able to be reliably suppressed.

Moreover, in this embodiment, when the ignition switch 18 is OFF, basically only the sub converter 16 is ON and the main converter 14 is OFF. Therefore, even when the load is operated due to an abnormality, electric power is supplied to the load only by the sub converter 16, and thus the capacity of the battery 10 is not greatly reduced.

Figure 3:
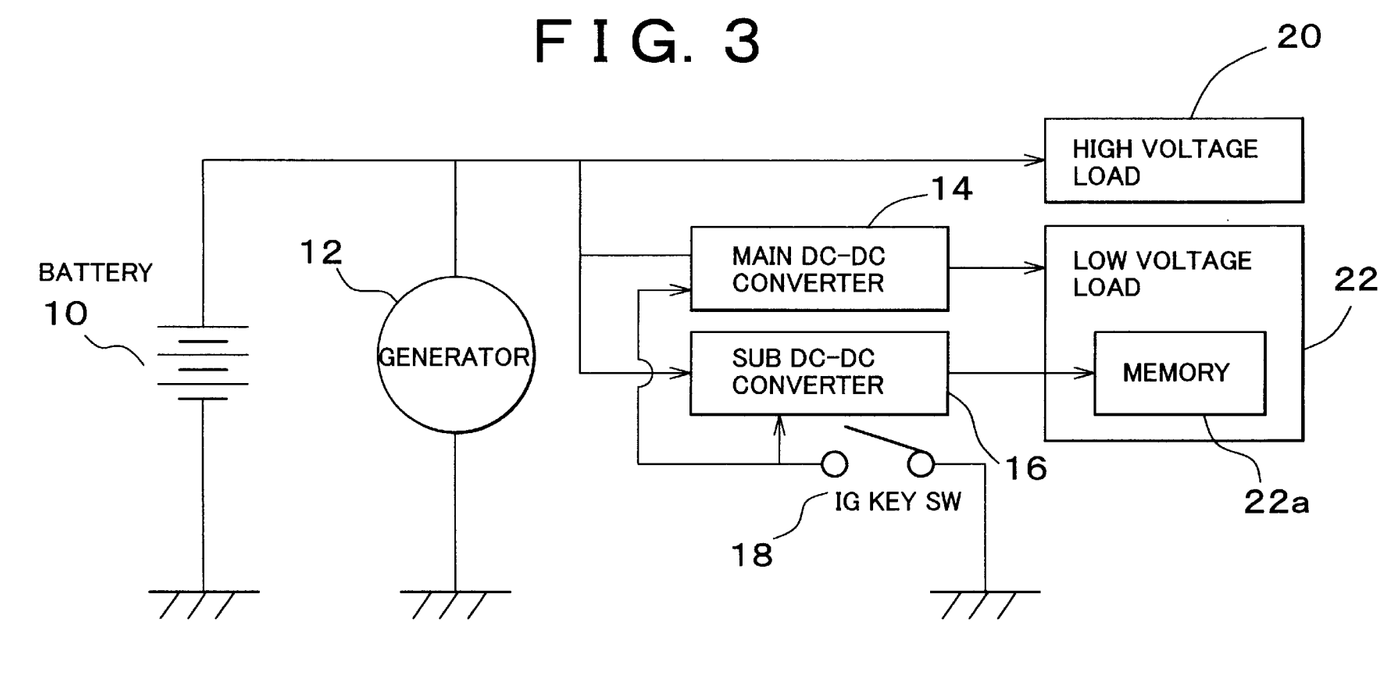
FIG. 3 is a view showing circuit configuration of a second embodiment according to the invention.

FIG. 3 shows a circuit configuration of a second embodiment according to the invention.

In the second embodiment, the main converter 14 and the sub converter 16 are each connected to different loads. The main converter 14 is connected to a power system load of the low voltage load 22 (a first load), while the sub converter 16 is connected to memory 22a (a second load) of the low voltage load 22 which is a load different from the power system load. Also in the second embodiment, the same process as that of FIG. 2 is applied. When the ignition switch 18 is turned OFF, the main converter 14 that supplies electric power to the power system load of the low voltage load 22 is deactivated and the sub converter that supplies electric power to the memory 22a of the low voltage load 22 is activated to supply the dark current to the memory 22a. When the ignition switch 18 is ON, the main converter 14 is ON and the sub converter 16 is OFF, similar to the first embodiment mentioned above.

Figure 4:
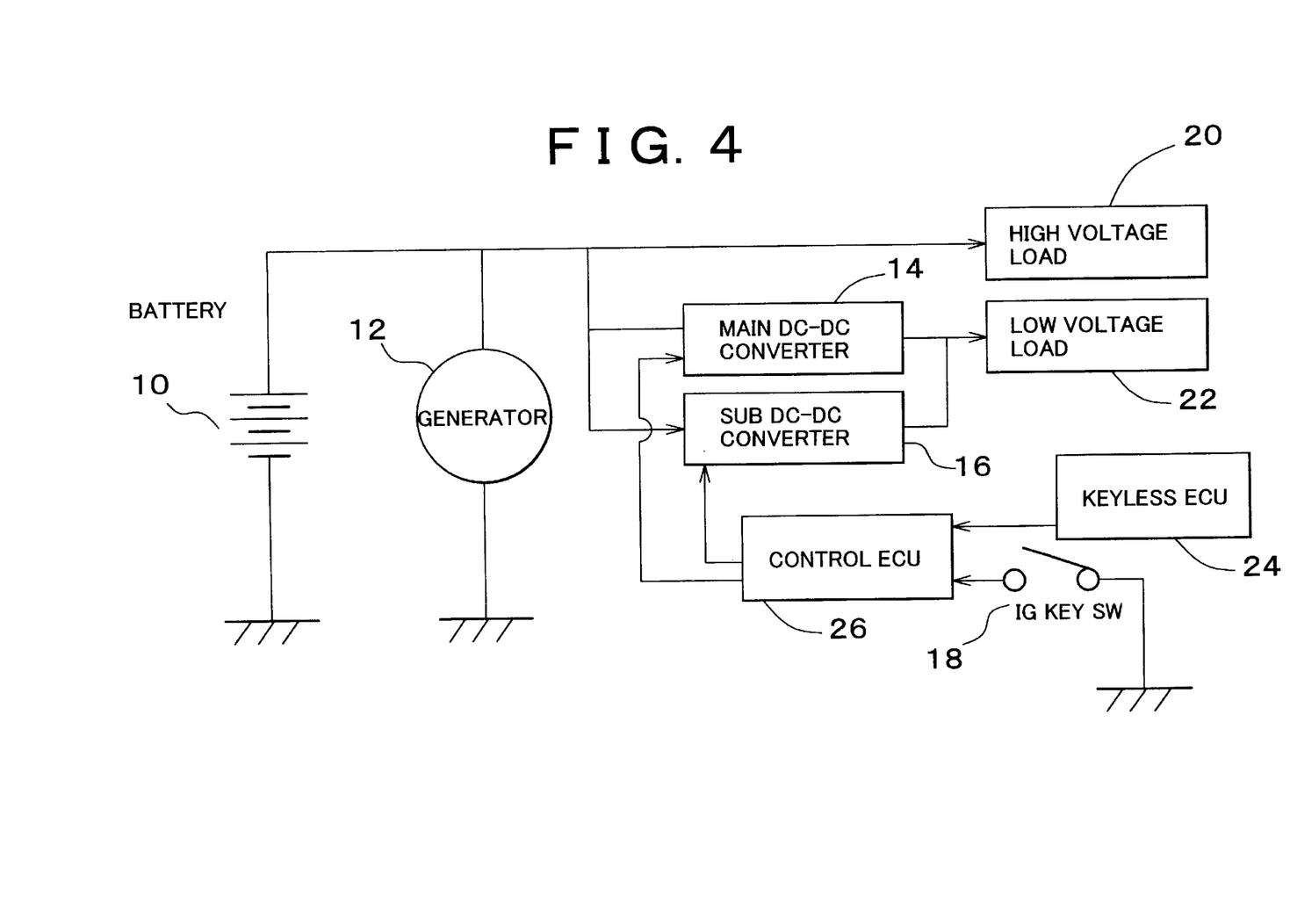
FIG. 4 is a view showing circuit configuration of a third embodiment according to the invention.

FIG. 4 shows the circuit configuration of a third embodiment according to the invention. In this embodiment, in addition to the configuration of the first embodiment shown in FIG. 1, a keyless ECU (electronic control unit) 24 and a control ECU 26 are provided. The keyless ECU 24 and the control ECU 26 are fed with electric power from the sub converter 16 while in their stand-by states, and fed with electric power from the main converter 14 when the main switch 18 is ON.

The keyless ECU 24 that detects operation (a door unlocking operation) of a transmitter carried by the operator, in a non-contact manner, detects unlocking of the doors of the vehicle. More specifically, the keyless ECU 24 that possesses an infrared detector detects a signal to unlock the doors transmitted by the transmitter. If the keyless ECU 24 detects unlocking of the doors while in the stand-by state maintained by electric power from the sub converter 16, the keyless ECU 24 sends a detection signal to the control ECU 26. An ON/OFF signal of the ignition switch 18 is also sent to the control ECU 26, and the control ECU controls operation of the main converter 14 and the sub converter 16 in accordance with these two detection signals.

Figure 5:
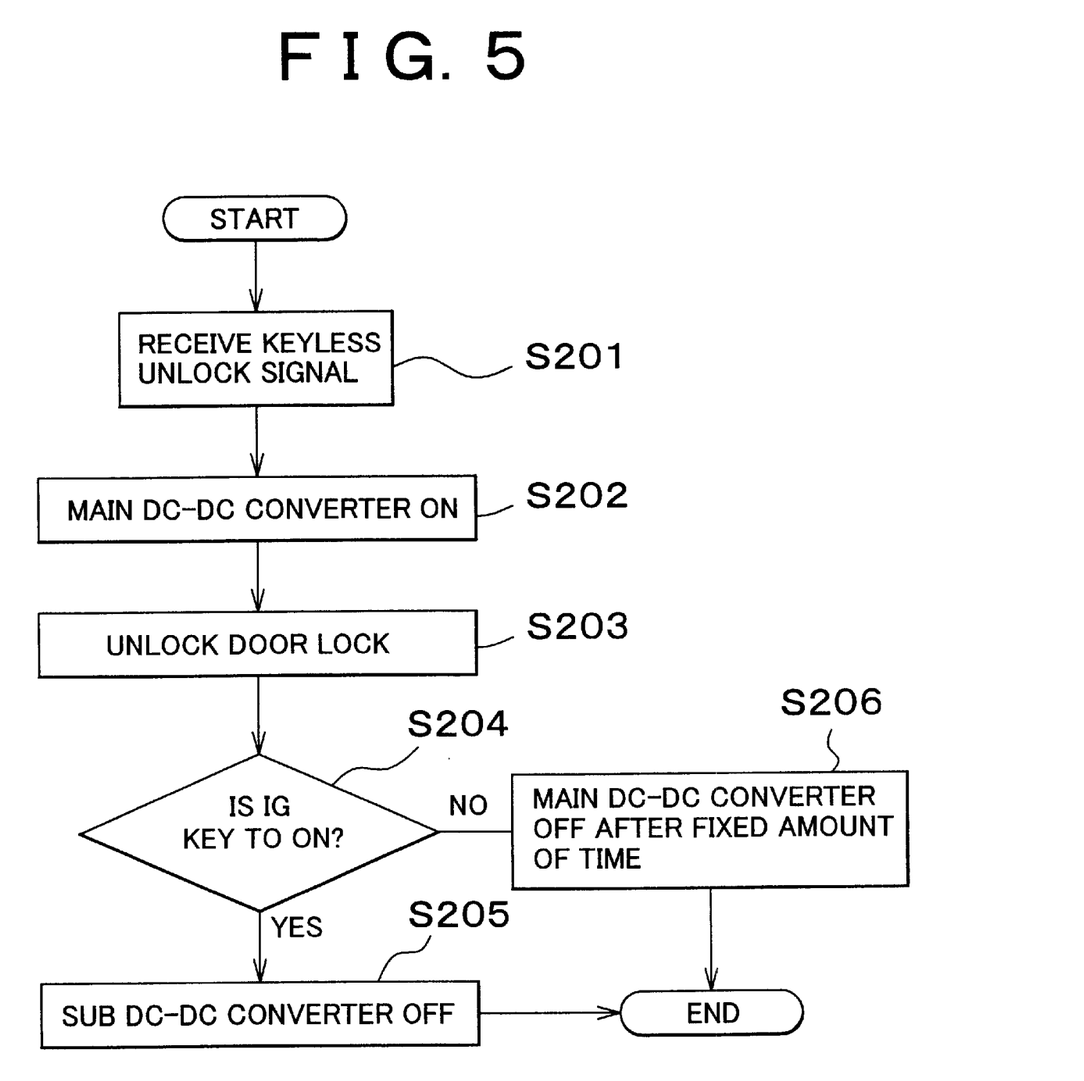
FIG. 5 is a process flowchart of the third embodiment according to the invention.

FIG. 5 shows a process flowchart of the third embodiment. First, if the control ECU 24 detects a keyless door unlock (keyless unlock) signal while in the stand-by state maintained by electric power from the sub converter 16 (Step S201), the control ECU 24 supplies a control signal to the main converter 14. Similar to the first embodiment, when the ignition switch 18 is OFF, the sub converter 16 is ON in order to supply the dark current to the low voltage load 22 while the main converter 14 is OFF. Therefore, the control ECU 26 supplies the control signal to the main converter 14 that has been OFF, turning it from OFF to ON (Step S202). Accordingly, the control ECU 26 makes the main converter 14 reduce the high voltage (36 V) of the battery 10 and supply it to the low voltage load 22 to effect unlocking of the door lock (Step S203).

After turning ON the main converter 14 to unlock the door lock, the control ECU 26 further judges whether or not the ignition switch 18 is turned ON (Step S204). Normally, when the door lock is unlocked, it is most likely that the operator gets into the vehicle and turns ON the ignition switch 18. Therefore, when the ignition switch 18 is turned ON, the control ECU 26 supplies a control signal to the sub converter 16 to turn it OFF and at the same time maintains the main converter 14 in the ON state (Step S205).

When the ignition switch 18 is not turned ON after the door lock was unlocked, the main converter 14 is turned from ON to OFF with a predetermined delay, specifically after the fixed amount of time (Step S206). The reason for allowing a predetermined delay is because of consideration for the time necessary for the operator to operate the ignition switch 18. Note that also in this case, the sub converter 16 is ON as it was.

Thus, in the third embodiment, when there arises a need to operate the load independently from the ignition switch 18, the main converter 14 can be turned from OFF to ON to supply a specified amount of electric power to the load; thus the load can quickly be operated. Moreover, if the ignition switch 18 is not turned ON after that, the main converter 14 returns to the OFF state again; thus the capacity of the battery 10 is not unnecessarily reduced.

Figure 6:
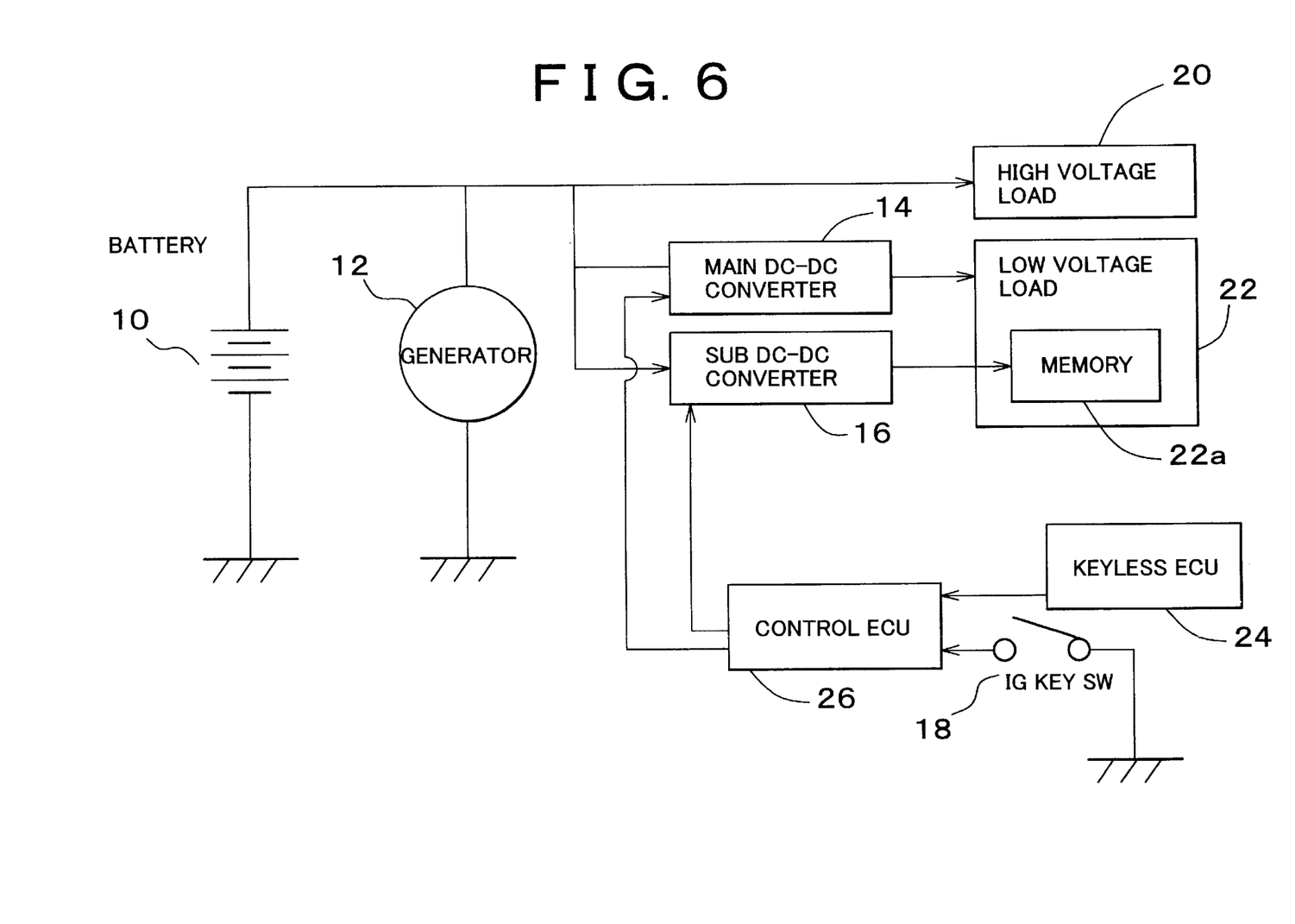
FIG. 6 is a view showing a circuit configuration of a fourth embodiment according to the invention.

FIG. 6 shows a circuit configuration of a fourth embodiment according to the invention.

In the fourth embodiment, the main converter 14 and the sub converter 16 are each connected to different loads. The main converter 14 supplies electric power to the power system load of the low voltage load 22, and the sub converter 16 supplies the dark current to the memory 22a of the low voltage load 22. Also in the fourth embodiment, the same processes as those in FIG. 5 are applied. While the ignition switch 18 is OFF, the sub converter 16 supplies the dark current to the memory 22a to retain the content of the memory. When the operator wishes to unlock the door lock, the main converter 14 is turned from OFF to ON to supply a specified amount of electric power to the power system load of the low voltage load 22.

In the above-mentioned embodiments, explained was a case where the voltage of the battery is reduced with the DC-DC converter and supplied to the load. However the invention can be applied to a case where the voltage of the battery is increased according to the voltage.

Moreover, explained was a case where the sub converter 16 supplies the dark current to the low voltage load when the load is not being operated. However the sub converter 16 may be turned ON to supply the load with a smaller amount of electric power than that for normal operation other than the dark current. For example, in the configuration of FIG. 1, the main converter 14 and the sub converter 16 are connected in parallel to each other and then connected to the low voltage load 22. It is also preferable that when the operation situation of the low voltage load 22 changes and there arises a need to operate the load with a lower amount of electric power than that for normal operation, the control ECU 26 detects this and turns the main converter 14 from ON to OFF while turning the sub converter 16 from OFF to ON. Naturally, when the operation situation of the load changes from one with a small amount of electric power to one with a large amount of electric power, the control ECU 26 turns the main converter 14 from OFF to ON and turns the sub converter 16 from ON to OFF. When the activation and the deactivation of the main converter 14 and the sub converter 16 are changed alternately, this change may be done with a fixed delay, as in the already described embodiments, with a period of time provided when both DC-DC converters are ON.

Figure 7:
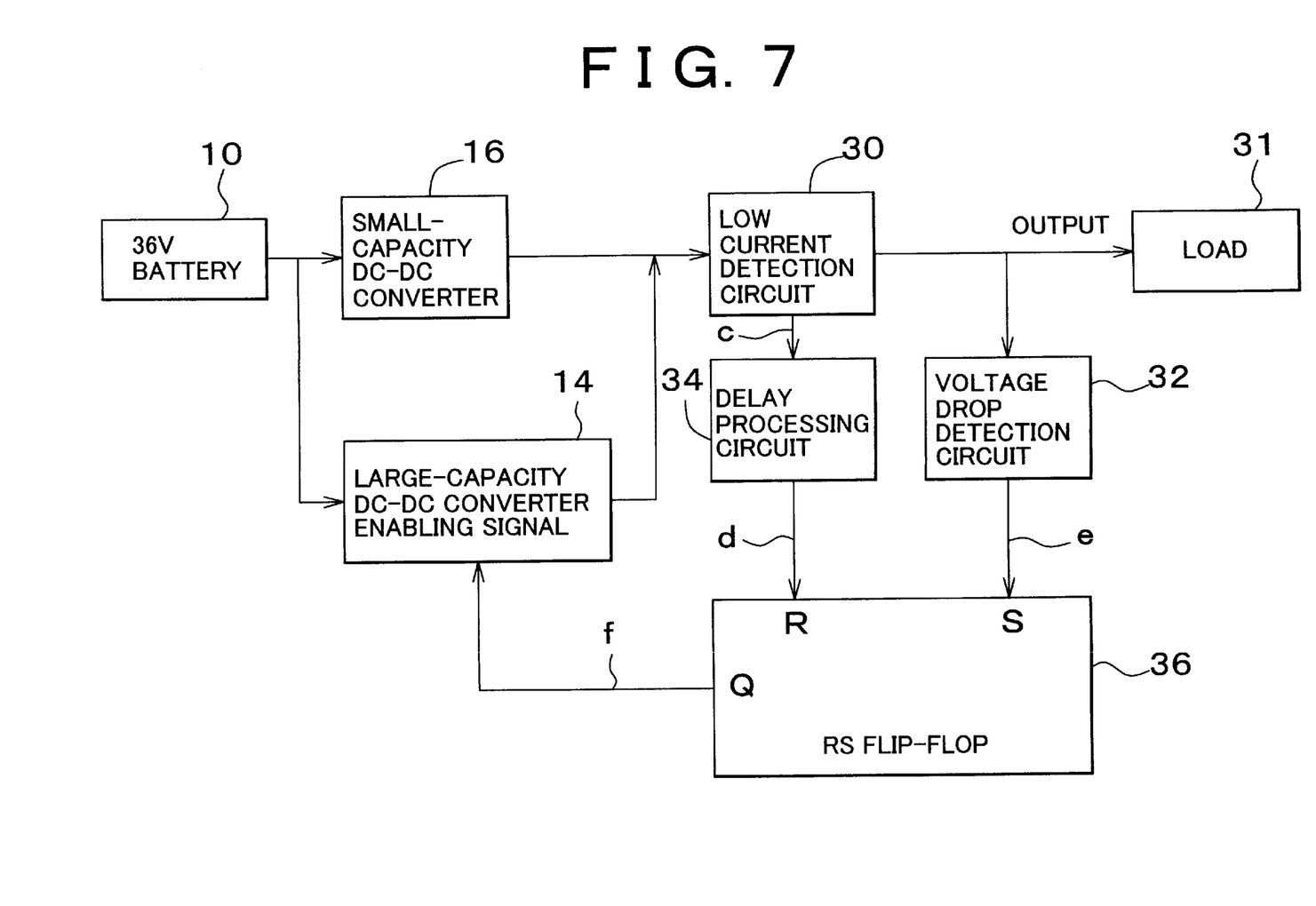
FIG. 7 is a view showing a circuit configuration of a fifth embodiment according to the invention.

FIG. 7 shows the circuit block diagram of a fifth embodiment. A large-capacity DC-DC converter (main DC-DC converter) 14 and a small-capacity DC-DC converter (sub DC-DC converter) 16 are connected in parallel to the battery 10 whose voltage is 36 V. The large capacity DC-DC converter 14 may have, for example, a capacity of 100 A and the small-capacity DC-DC converter 16 may have, for example, a capacity of 100 mA. The large-capacity DC-DC converter 14 and the small-capacity DC-DC converter 16 are both connected to a load 31, and supply it with a driving current and the dark current, respectively.

Connected between the load 31 and parallel connection of the large-capacity DC-DC converter 14 and the small-capacity DC-DC converter 16 is a low-current detection circuit 30 and a voltage drop detection circuit 32, which detect when an output current of the converters becomes equal to or less than a predetermined value (e.g., 100 mA) and when an output voltage becomes equal to or less than a predetermined value (e.g., 12 V), respectively, and output the detection signals, respectively.

The detection signal from the low current detection circuit 30 is sent to a delay processing circuit 34, and after specified processing at the delay processing circuit, is sent to an R terminal (reset terminal) of an RS flip-flop 36. Meanwhile, the detection signal from the voltage drop detection circuit 32 is sent to an S terminal (set terminal) of the RS flip-flop 36.

When an enabling signal for controlling the activation of the large-capacity DC-DC converter 14 is sent from a Q output terminal of the RS flip-flop 36, specifically, when a High signal is outputted from a Q terminal, the large-capacity DC-DC converter 14 is activated. When a Low signal is outputted from the Q terminal, the large-capacity DC-DC converter 14 is deactivated. Therefore, when a signal is sent to the R terminal from the delay processing circuit 34, the Low signal is outputted from the Q terminal to deactivate of the large-capacity DC-DC converter 14, such that only the small-capacity DC-DC converter 16 is activated to supply electric power to the load 31. When a signal from the voltage drop detection circuit 32 is sent to the S terminal, the High signal is sent from the Q terminal to effect activation of the large-capacity DC-DC converter 14, such that electric power is supplied to the load 31 by two converters, being the large-capacity DC-DC converter 14 and the small-capacity converter 16.

Here, when the delay processing circuit 34 is supplied with a detection signal indicating that the output current has dropped equal to or less than a predetermined value at the low current detection circuit 30, the delay processing circuit 34 delays the detection signal by a predetermined time and outputs it. More specifically, when the output signal of only a fixed period of time is output from the low current detection current 30, that is, when the continuously output current of only a fixed period of time becomes equal to or less than a predetermined value, the delay processing circuit 34 outputs that output current. Such a circuit can be composed of a switching transistor, a capacitor, and a comparator. That is, the delay processing circuit 34 should be configured in such way that when a detection signal is continuously outputted from the low current detection circuit 30 for a fixed period of time, the switching transistor is turned OFF to charge the condenser, and when a voltage of the capacitor terminal rises to so as be equal to or greater than a threshold value, the comparator outputs a signal.

With a configuration as described above, hereafter operation of the fifth embodiment will be described referring to a timing chart of FIG. 8.

Figure 8:
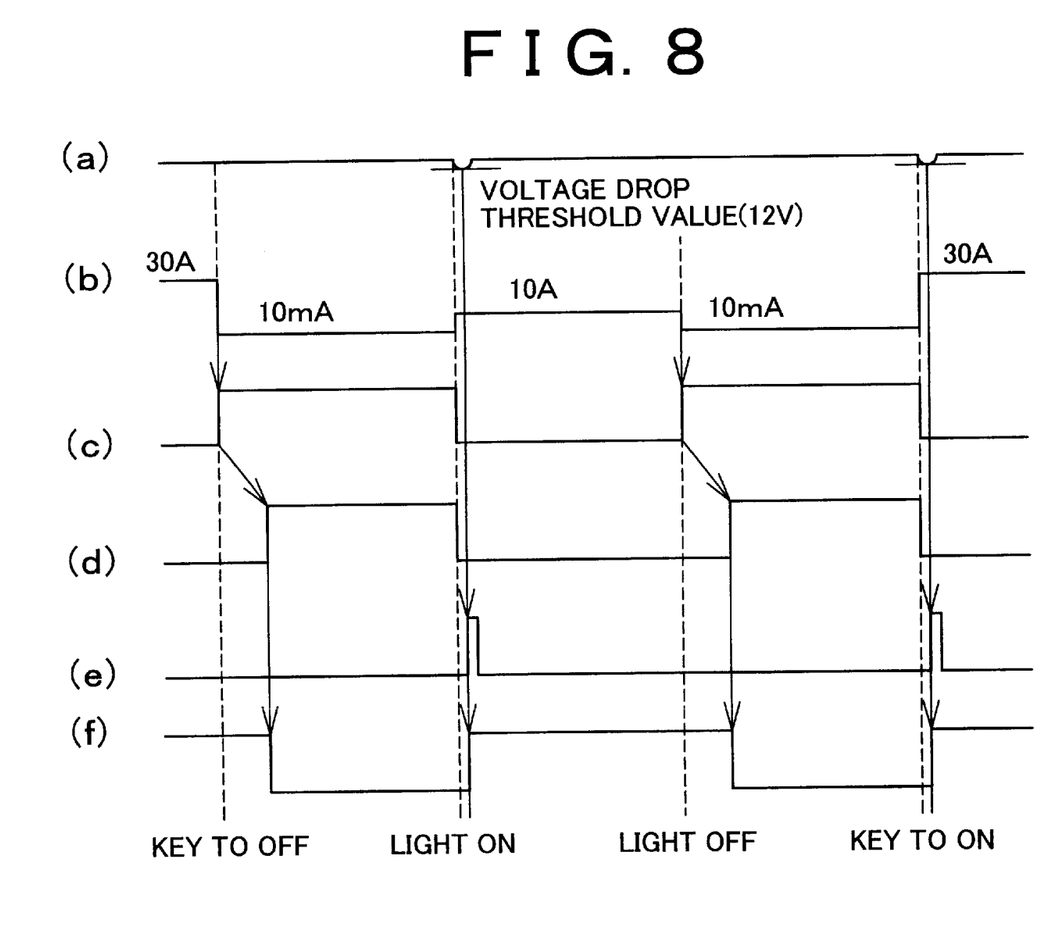
FIG. 8 is a timing chart in the fifth embodiment according to the invention.

In FIG. 8, a line (a) indicates an output voltage of the converter. while a line (b) indicates an output current of the converter. When the driver turns the ignition key to OFF, the output current decreases abruptly (e.g., from 30 A to 10 mA). This decrease of the current value is detected by the low current detection circuit 30, and, as shown by a line (c), a detection signal maintained in the high state only for a period when the output current decreases to 10 mA is outputted to the delay processing circuit 34.

Since the delay processing circuit 34 outputs a signal maintained in the high state only when the detection signal is sent from the low current detection circuit 30 continuously for the fixed period of time as described above, the delay processing circuit 34 outputs the High signal, which is delayed by a fixed amount of time with respect to the line (c), as shown by a line (d), to the RS flip-flop 36. The reason that the delay processing circuit 34 outputs the High signal when the detection signal is inputted thereto continuously for only the fixed amount of time is to reliably prevent a situation in which the large-capacity DC-DC converter 14 is erroneously deactivated in the case where the current value is temporarily decreased by noise at precisely the time when the large-capacity DC-DC converter 14 should be originally activated. When the High signal is sent to the R terminal of the RS flip-flop 36 from the delay processing circuit 34, the Q terminal of the RS flip-flop terminal 36 changes from High to Low as shown by a line (f), and as a result the large-capacity DC-DC converter 14 terminates its operation after the fixed amount of time after the ignition key was turned to OFF. Thus, the dark current supply to the load is carried out through the small-capacity DC-DC converter 16.

When a light bulb (e.g., a head light) as one of the load 31 is turned ON with the ignition key turned to OFF, the output current increases up to 10 A and at the same time the output voltage decreases down to 12 V or less because the output exceeds an output range of the small-capacity DC-DC converter 16. By the increase of the output current to 10 A, the signal from the low current detection circuit 30 changes from High to Low as shown by the line (c), and the signal from the delay processing circuit 34 also changes from High to Low as shown by the line (d). Note that in the delay processing circuit 34, when the signal rises from Low to High, there exists the fixed delay time for the change to take place as described above, but when the signal falls from High to Low, there is no delay. Moreover, the voltage drop detection circuit 32 detects a drop in the output voltage and outputs a detection signal, as shown in a line (e), which is supplied to the S terminal of the RS flip-flop 36. By this signal input, as shown in the line (f), the High signal is outputted from the Q terminal of the RS flip-flop 36 to effect activation of the large-capacity DC-DC converter 14, which supplies electric power required to turn on the light bulb.

Next, when the driver turns the light OFF again, the output current decreases down to 10 mA again so after the fixed amount of time, as in the case when the driver turns the ignition key to OFF, the large-capacity DC-DC converter 14 turns OFF such that only the small-capacity DC-DC converter 16 is activated.

Further, when the driver turns the ignition key to ON again, the Low signal is sent to the R terminal of the RS flip-flop 36 from the delay processing circuit 34 as shown by the line (d), the High signal is sent to the S terminal of the RS flip-flop 36 from the voltage drop detection circuit 32 as shown by the line (e), and the Q terminal changes from Low to High to effect activation of the large-capacity DC-DC converter 14 again, which changes the voltage of the battery 10 and supplies it to the load 31.

Incidentally, when the driver turns ON the hazard lights after turning the ignition key to OFF, the output current repeatedly increases and decreases in short cycles (e.g. in intervals of about one second or so). In this case, by setting a delay time at the delay processing circuit 34 to be longer than this time, a situation in which the large-capacity DC-DC converter 14 repeatedly turns ON and OFF in response to blinking of the hazard lights can reliably be prevented (the Q terminal will not become Low unless the output current is equal to or less than a predetermined value for a fixed continuation time), and thus variation of the output voltage can be prevented.

As described above, when the driver turns the ignition key to OFF, the large-capacity DC-DC converter 14 turns OFF after the fixed amount of time such that only the small-capacity DC-DC converter 16 supplies the dark current, thereby suppressing power consumption by the large-capacity DC-DC converter 14. Meanwhile, when the load is operated when the ignition is OFF as well as when it is ON, the large-capacity DC-DC converter 14 turns ON to supply the driving current. This obviates the need to additionally provide a low voltage (e.g. 12 V) battery for supplying the dark current and reduces the weight when this power supply is to be installed in a vehicle (because the weight of the small-capacity DC-DC converter 16 can be reduced considerably compared to the low voltage battery). In addition, when the large-capacity DC-DC converter 14 is activated, the small capacity DC-DC converter 16 may either be activated or deactivated.

As explained above, according to the invention, the required electric power can be supplied to the load while suppressing the capacity reduction of the battery.

What is claimed is:

1. A power supply circuit for a vehicle that supplies electric power to a load, comprising:
   a battery;
   a first converter that changes a voltage of the battery and supplies main electric power to the load,
   a second converter that is connected with the first converter in parallel with regard to the load and changes the voltage of the battery and supplies auxiliary electric power to the load; and
   a converter control portion that makes the first converter activate when a switch that operates the load is in the ON state and makes the first converter inactivate and makes the second converter activate when the switch is in the OFF state.

2. A power supply circuit according to claim 1, and wherein:
   the converter control portion makes the first converter activate and the second converter inactivate when the switch is in ON state, and makes the first converter inactivate and the second converter activate when the switch is in OFF state.

3. A power supply circuit according to claim 2, wherein:
   the first converter has a larger capacity than the second converter.

4. A power supply circuit according to claim 2, wherein:
   the first converter is deactivated after a predetermined delay after the switch is turned OFF.

5. A power supply circuit according to claim 1 wherein:
   the converter control portion makes the first converter activate and the second converter always inactivate when the switch is in ON state.

6. A power supply circuit according to claim 5, wherein:
   the first converter has a large capacity than the second converter.

7. A power supply circuit according to claim 5, wherein:
the first converter is deactivated after a predetermined delay after the switch is turned OFF.

8. A power supply circuit according to claim 1, wherein:
the load has a first load and a second load;
the first converter supplies the main electric power to the first load; and
the second converter supplies the auxiliary electric power to the second load.

9. A power supply circuit according to claim 1, wherein:
the switch is an ignition switch of the vehicle.

10. A power supply circuit according to claim 1, wherein:
the auxiliary electric power is electric power required when the load is not being operated.

11. A power supply circuit for a vehicle that supplies electric power to a load, comprising:
a battery;
a first converter that changes a voltage of the battery and supplies main electric power to the load,
a second converter that is connected with the first converter in parallel with regard to the load and changes the voltage of the battery and supplies auxiliary electric power to the load,
a detector that detects output currents to the load; and
a converter control portion that makes the first converter activate when the output voltage detected by the detector is greater than a predetermined value, and makes the first converter inactivate and the second converter activate when the output voltage detected by the detector is equal to or less than the predetermined value.

12. A power supply circuit according to claim 11, and wherein:
the converter control portion makes the first converter activate and the second converter inactivate when the output voltage detected by the detector is greater than a predetermined value, and makes the first converter inactivate and the second converter activate when the output voltage detected by the detector is equal to or less than the predetermined value.

13. A power supply circuit according to claim 12, wherein:
the first converter has a larger capacity than the second converter.

14. A power supply circuit according to claim 12, wherein:
the first converter is deactivated after a predetermined delay after the output voltage detected by the detector is equal to or less than the predetermined value.

15. A power supply circuit according to claim 11 wherein:
the converter control portion makes the first converter activate and the second converter always inactivate when the output voltage detected by the detector is greater than a predetermined value.

16. A power supply circuit according to claim 15, wherein:
the first converter has a large capacity than the second converter.

17. A power supply circuit according to claim 15, wherein:
the first converter is deactivated after a predetermined delay after the output voltage detected by the detector is equal to or less than the predetermined value.

18. A power supply circuit according to claim 11, wherein:
the load has a first load and a second load;
the first converter supplies the main electric power to the first load; and
the second converter supplies the auxiliary electric power to the second load.

19. A power supply circuit according to claim 11, wherein:
the auxiliary electric power is electric power required when the load is not being operated.

20. A power supply circuit for a vehicle that supplies electric power to a load, comprising:
a battery;
a first converter that changes a voltage of the battery and supplies main electric power to the load; and
a second converter that is connected with the first converter in parallel with regard to the load and changes the voltage of the battery and supplies auxiliary electric power to the load
a converter control portion that makes the first converter activate when the load is active, and makes the first converter inactivate and the second converter activate when the load is inactive.

21. A power supply circuit according to claim 20, and wherein:
the converter control portion makes the first converter activate and the second converter inactivate when the load is active, and makes the first converter inactivate and the second converter activate when the load is inactive.

22. A power supply circuit according to claim 21, wherein:
the first converter has a larger capacity than the second converter.

23. A power supply circuit according to claim 21, wherein:
the first converter is deactivated after a predetermined delay after the load is made inactive.

24. A power supply circuit according to claim 20 wherein:
the converter control portion makes the first converter activate and the second converter always inactivate when the load is active.

25. A power supply circuit according to claim 24, wherein:
the first converter has a large capacity than the second converter.

26. A power supply circuit according to claim 24, wherein:
the first converter is deactivated after a predetermined delay after the load is made inactive.

27. A power supply circuit according to claim 20, wherein:
the load has a first load and a second load;
the first converter supplies the main electric power to the first load; and
the second converter supplies the auxiliary electric power to the second load.

28. A power supply circuit according to claim 20, wherein:
the auxiliary electric power is electric power required when the load is inactive.

* * * * *